United States Patent
Yan et al.

(10) Patent No.: US 8,111,448 B2
(45) Date of Patent: Feb. 7, 2012

(54) ELECTROPHORETIC DISPLAY DEVICE

(75) Inventors: Li-Jia Yan, Shenzhen (CN); Kuan-Hong Hsieh, Taipei Hsien (TW); Chun-Wei Pan, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/790,872

(22) Filed: May 31, 2010

(65) Prior Publication Data

US 2011/0069373 A1    Mar. 24, 2011

(30) Foreign Application Priority Data

Sep. 23, 2009 (CN) .......................... 2009 1 0307538

(51) Int. Cl.
*G02B 26/00* (2006.01)
*G03G 17/04* (2006.01)
*G09G 3/34* (2006.01)
*G02F 1/133* (2006.01)

(52) U.S. Cl. ............. 359/296; 430/32; 345/107; 349/33

(58) Field of Classification Search .................. 359/296; 430/31–32; 345/107; 349/33
See application file for complete search history.

(56) References Cited

U.S. PATENT DOCUMENTS

| 6,486,866 | B1* | 11/2002 | Kuwahara et al. | 345/107 |
| 7,399,989 | B2* | 7/2008 | Moriya et al. | 257/40 |
| 2002/0180688 | A1* | 12/2002 | Drzaic et al. | 345/107 |
| 2006/0202949 | A1* | 9/2006 | Danner et al. | 345/107 |

* cited by examiner

*Primary Examiner* — Dawayne A Pinkney
(74) *Attorney, Agent, or Firm* — Altis Law Group, Inc.

(57) ABSTRACT

An electrophoretic display device includes pixel electrodes, a transparent electrode, and an electrophoretic ink layer including cavities. Each cavity is arranged between one of the pixel electrodes and the transparent electrode, and each cavity comprises suspension fluid, charged particles, and neutral particles, the charged particles and neutral particles being dispersed in the suspension fluid. The neutral particles are dispersed in the center of the cavities and substantially stationary, and the charged particles are capable of moving through the suspension fluid. Application of an electric field to a pixel electrode and the transparent electrode causes a migration of the charged particles of a cavity connected to the pixel electrode and a corresponding color becomes viewable.

10 Claims, 3 Drawing Sheets

ELECTROPHORETIC DISPLAY DEVICE

BACKGROUND

1. Technical Field

The present disclosure relates to display devices and, more particularly, to an electrophoretic display device.

2. Description of Related Art

In general, an electrophoretic display device includes a top clear electrode, a bottom electrode, and cavities between the top electrode and the bottom electrode. Each cavity may contain positively charged particles of one color and negatively charged particles of another color, such that application of an electric field to the top and bottom electrodes causes a migration of the particles of one color or the other color, depending on the polarity of the field, toward the surface of the cavity effecting a perceived color change.

However, positively charged particles and negatively charged particles tend to attract each other, making migration of the particles difficult. In addition, the charge of the positively charged particles and negatively charged particle can be counteracted if the positively charged particles and negatively charged particle contact each other for a long time, and so the service life of the electrophoretic display device is shortened accordingly.

BRIEF DESCRIPTION OF THE DRAWINGS

The components in the drawings are not necessarily drawn to scale, the emphasis instead being placed upon clearly illustrating the principles of the electrophoretic display device. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
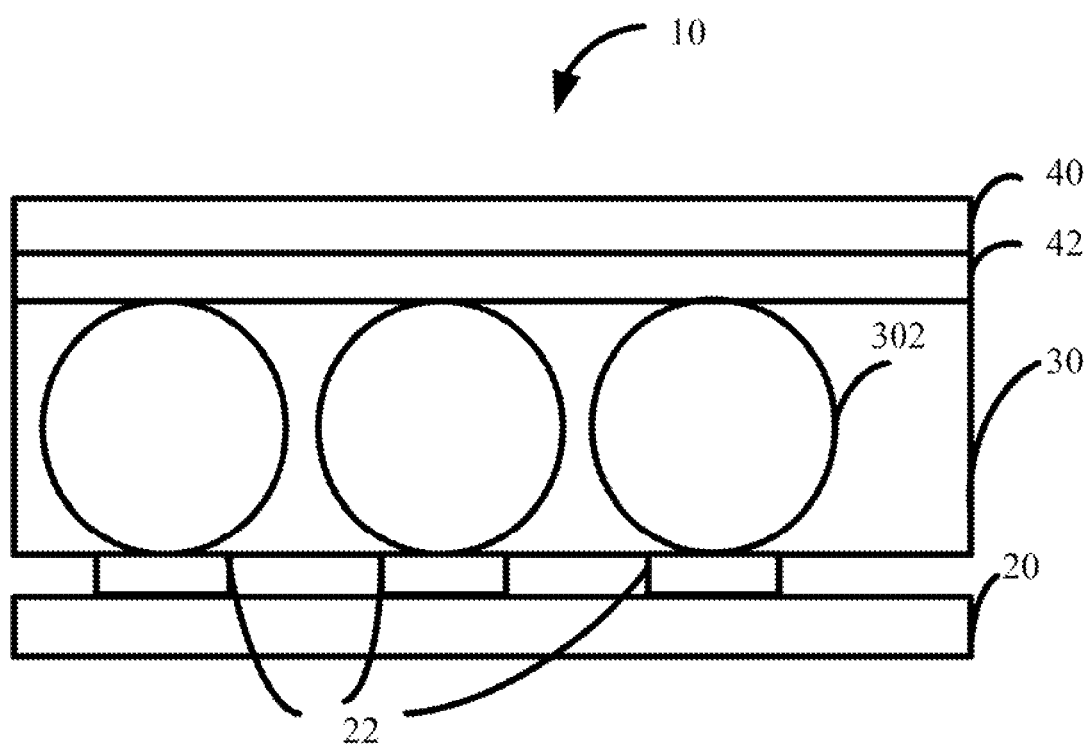
FIG. 1 is a schematic, cross-sectional view showing an electrophoretic display device in accordance with an exemplary embodiment.

Referring to FIG. 1, an electrophoretic display device 10 includes a lower substrate 20, an electrophoretic ink layer 30, and an upper substrate 40. The electrophoretic ink layer 30 is arranged between the lower substrate 20 and the upper substrate 40, and the upper substrate 40 is used to protect the electrophoretic ink layer 30 of the electrophoretic display device 10.

The lower substrate 20 can be made of plastic or glass. A plurality of pixel electrodes 22 is formed on the lower substrate 20. The pixel electrodes 22 connect the electrophoretic ink layer 30 and the lower substrate 20.

A transparent electrode 42 is formed between the upper substrate 40 and the electrophoretic ink layer 30, which corresponds to a display surface of the upper substrate 40. In the embodiment, the transparent electrode 42 is grounded and is used as a common electrode and can be made of indium tin oxide.

The electrophoretic ink layer 30 includes a plurality of cavities 302 arranged in a matrix pattern. Each cavity 302 is between one pixel electrode 22 and the transparent electrode 42. In the embodiment, the cavities 302 are microcapsules and can be spherical, elliptical, or tubular for example. In other embodiments, the cavities 302 may be micro-cups.

Figure 2:
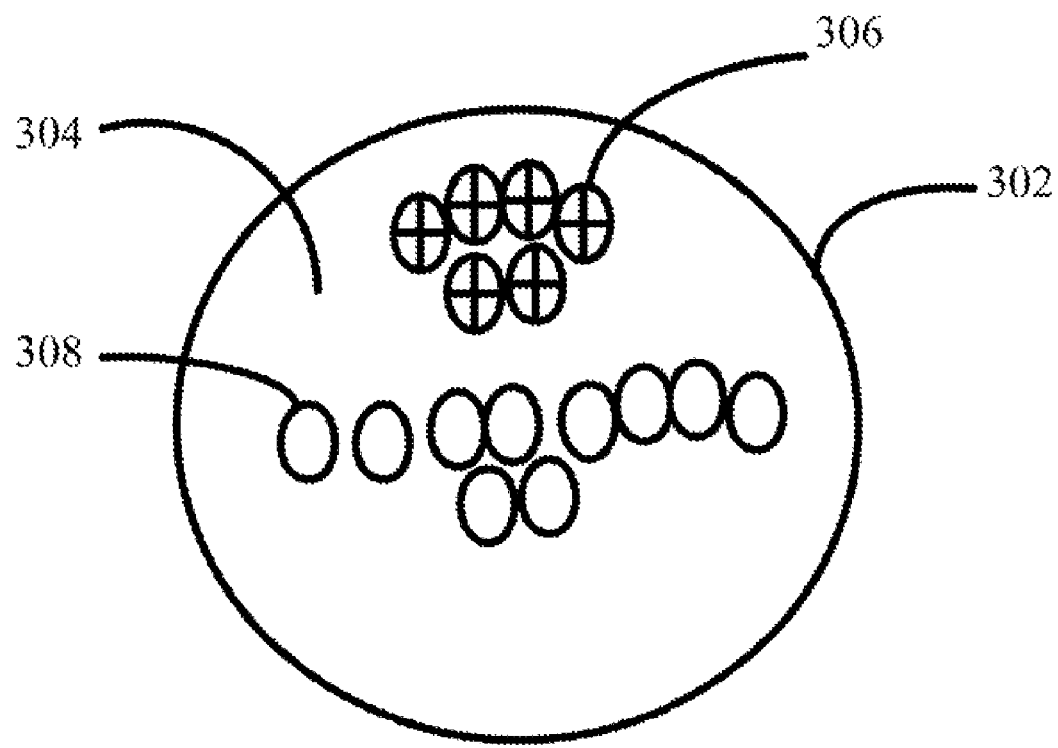
FIG. 2 is a structure view of a cavity of the electrophoretic display device of FIG. 1.

Referring also to FIG. 2, each cavity 302 contains transparent suspension fluid 304, charged particles 306, and neutral particle 308 dispersed in the suspension fluid 304. The charged particles 306 have a first color and the neutral particles 308 have a second color. For example, the charged particles 306 can be black and the neutral particles 308 can be white.

In the embodiment, the neutral particles 308 are dispersed in the center of the cavity 302 and substantially stationary. The charged particles 306 are capable of moving in the suspension fluid 304 to any position in the cavity 302. The charged particles 306 have high electrophoretic mobility and the neutral particles 308 have low electrophoretic mobility, for example, the electrophoretic mobility of the neutral particles 308 may be zero or close to zero, so the neutral particles 308 will not move or move very little, if any.

Once an electric field is applied the pixel electrodes 22 and the transparent electrode 42, the charged particles 306 are driven to move to or away from the transparent electrode 42 to form images on the electrophoretic display device 10. Specifically, after reaching a first side of the cavity 302 adjacent to the transparent electrode 42, the charged particles 306 are located between the transparent electrode 42 and the neutral particles 308, the color of the charged particles 306 in the cavity 302 are then viewable on the display. After reaching a second side of the cavity 302 adjacent to the electrode 22, the neutral particles 308 are located between the transparent electrode 42 and the charged particles 306, the color of the neutral particles 308, such as white, become viewable.

Figure 3:
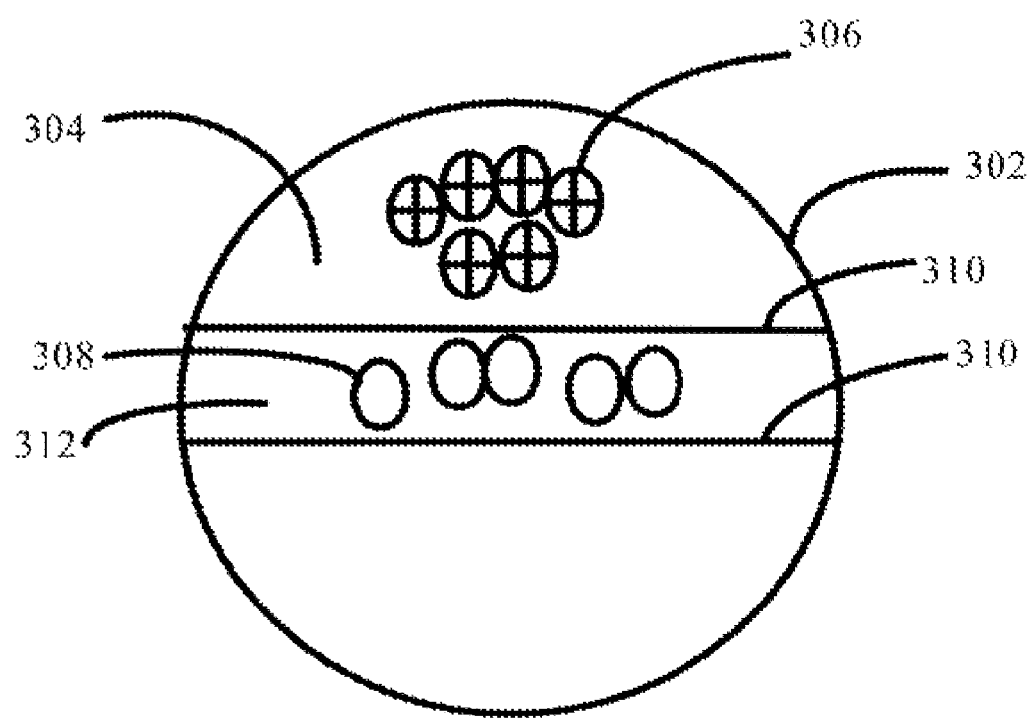
FIG. 3 is a structure view of a cavity of the electrophoretic display device of FIG. 1 in another embodiment.

Referring to FIG. 3, in another embodiment, each cavity 302 may further contain two transparent sheets 310 formed in the center of the cavity 302. The two transparent sheets 310 define a compartment 312 to receive the neutral particles 308. The two sheets 310 are films including a plurality of apertures, the sizes of which are smaller than the size of the neutral particles 308 and greater than the size of the charged particles 306. Therefore, the charged particles can pass through the two sheets but the neutral particles 308 are retained in the compartment 312 and incapable of moving out of the compartment 312. In the embodiment, the charged particles 306 have high electrophoretic mobility and the neutral particles 308 have low electrophoretic mobility, or both have high electrophoretic mobility.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. An electrophoretic display device comprising:
   a plurality of pixel electrodes;
   a transparent electrode;
   an electrophoretic ink layer comprising a plurality of cavities, each cavity being arranged between one pixel electrode of the plurality of pixel electrodes and the transparent electrode, and comprising suspension fluid, charged particles and neutral particles, the charged particles and neutral particles being dispersed in the suspension fluid;
   wherein, each cavity further comprises two transparent sheet formed in the center of the cavity, these two transparent sheets define a compartment to receive the neutral particles, the charged particles can pass through the two sheets but the neutral particles are retained in the compartment and incapable of moving out of the compartment.

2. The electrophoretic display device according to claim 1, wherein the two sheets are films including a plurality of apertures, the size of the plurality of apertures are smaller than the size of the neutral particles and greater than the size of the charged particles.

3. The electrophoretic display device according to claim 1, wherein the charged particles have a first color, and the neutral particles have a second color different from the first color.

4. The electrophoretic display device according to claim 3, wherein, application of an electric field to one of the plurality of pixel electrodes and the transparent electrode causes a migration of the charged particles of one of the plurality of cavities connected to the pixel electrode, when the charged particles move to the transparent electrode, the cavity displays the color of the charged particles; when the charged particles move away from the transparent electrode, the cavity displays the color of the neutral particles.

5. The electrophoretic display device according to claim 1, wherein the transparent electrode is grounded and is made of indium tin oxide.

6. The electrophoretic display device according to claim 1, further comprising a lower substrate and a upper substrate, the plurality of pixel electrodes are formed on the lower substrate and the transparent electrode are formed between the electrophoretic ink layer and the upper substrate.

7. The electrophoretic display device according to claim 6, wherein the lower substrate is made of glass or plastic.

8. The electrophoretic display device according to claim 1, wherein the cavities are microcapsules.

9. The electrophoretic display device according to claim 1, wherein the cavities are micro-cups.

10. The electrophoretic display device according to claim 8, wherein the shape of the microcapsules is one selected from the group consisting of spherical, elliptical, and tubular shape.

* * * * *